United States Patent [19]

Fukamachi et al.

[11] Patent Number: 4,472,233
[45] Date of Patent: Sep. 18, 1984

[54] RADIAL TIRE BUILDING DRUM

[75] Inventors: Yoshihiro Fukamachi, Higashimurayama; Tsuneharu Nakajima, Kodaira; Jun Mizuno, Niiza; Tadashi Maehara, Oume, all of Japan

[73] Assignee: Bridgestone Tire Company Limited, Tokyo, Japan

[21] Appl. No.: 512,995

[22] Filed: Jul. 12, 1983

[30] Foreign Application Priority Data

Jul. 13, 1982 [JP] Japan .................................. 57-121620

[51] Int. Cl.³ .......................................... B29H 17/16
[52] U.S. Cl. ..................................... 156/415; 156/416; 156/419
[58] Field of Search ....................... 156/394.1, 414, 415, 156/416, 417, 419, 126

[56] References Cited

U.S. PATENT DOCUMENTS

| | | | |
|---|---|---|---|
| 3,107,192 | 10/1963 | McNenney | 156/415 X |
| 3,929,546 | 12/1975 | Katagiri et al. | 156/417 |
| 4,151,035 | 4/1979 | Jellison | 156/415 |
| 4,243,451 | 1/1981 | Kortman | 156/416 X |
| 4,292,112 | 9/1981 | Kumagai | 156/415 |

Primary Examiner—William A. Powell
Assistant Examiner—Thomas Bokan
Attorney, Agent, or Firm—Cushman, Darby & Cushman

[57] ABSTRACT

A radial tire building drum for forming a radial tire green case having bead portions into a toroidal shape, includes a drive shaft rotatable about a center axis of rotation and movable in a fore-and-aft direction thereof, a pair of drum units carried on the drive shaft and having a common center axis of rotation which is in axially alignment with the center axis of the drive shaft, the drum units being axially movable toward and away from each other along the center axis of the drive shaft by driving at least one of the drum units to move along the common center axis of rotation, a plurality of arcuate drum segments each retained to the pair of drum units and formed with an annular groove circumferentially extending therethrough, each of the arcuate drum segments being radially movable toward and away from the common center axis. The drum further includes a pair of annular rubber sealing members for hermetically sealing space defined by the green case and the pair of drum units and each having a radially inner end portion, a radially outer end portion and a bellows portion intervening between the radially outer end portion and the radially inner end portion, the radially inner end portions being supported by the drum units, the radially outer end portions being tightly received in the annular grooves formed in the arcuate drum segments.

4 Claims, 3 Drawing Figures

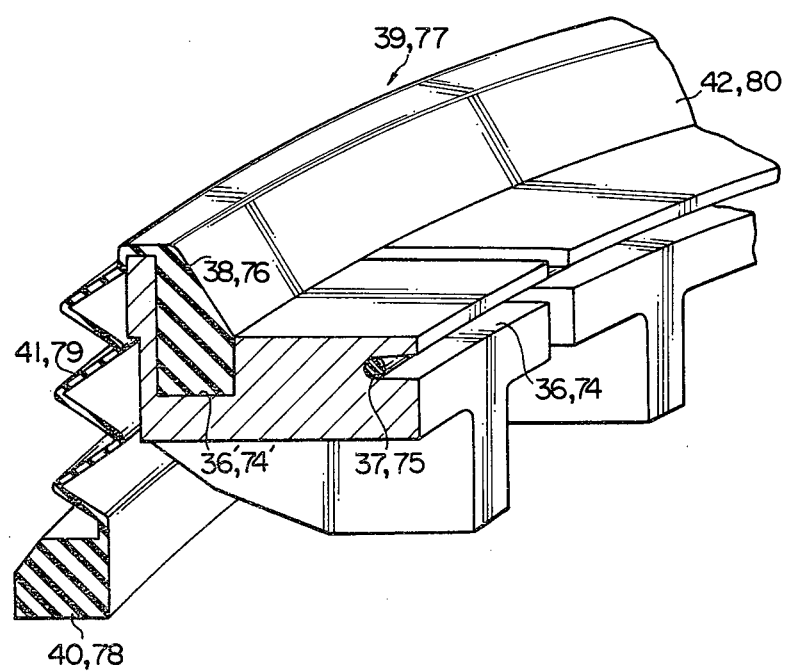

RADIAL TIRE BUILDING DRUM

FIELD OF THE INVENTION

The present invention relates to a radial tire building drum which is employed in a radial tire building machine in a second stage process and equipped without bladders and in which a radial tire green case fabricated by a first stage process is to be formed into a toroidal shape.

SUMMARY OF THE INVENTION

In accordance with an aspect of the present invention, a radial tire building drum is provided which comprises a drive shaft rotatable about a center axis of rotation and movable in a fore-and-aft direction thereof, a pair of drum units carried on the drive shaft and having a common center axis of rotation which is in axially alignment with the center axis of the drive shaft, the drum units being axially movable toward and away from each other along the center axis of the drive shaft by driving at least one of the drum units to move along the common center axis of rotation, a plurality of arcuate drum segments each retained to the pair of drum units and formed with an annular groove circumferentially extending therethrough, each of the arcuate drum segments being radially movable toward and away from the common center axis, and a pair of annular rubber sealing members for hermetically sealing space defined by the green case and the pair of drum units and each having a radially inner end portion, a radially outer end portion and a bellows portion intervening between the radially outer end portion and the radially inner end portion, the radially inner end portions being supported by the drum units, the radially outer end portions being tightly received in the annular grooves formed in the arcuate drum segments.

The radially outer end portion of the annular rubber sealing member has an inclined surface axially inwardly extending from its radially inner end to its radially outer end as a whole in the shape of frusto-conical, the intersected angle between the center axis of the drive shaft and the inclined surface ranging from 40 to 60 degrees.

BRIEF DESCRIPTION OF THE DRAWINGS

The features and advantages of a radial tire building drum according to the present invention will be appreciated from the following description taken in conjunction with the accompanying drawings in which:

FIG. 3 is an enlarged fragmentary cross sectional view showing the construction and arrangement of a drum segment and an annular rubber sealing member shown in FIG. 1.

DESCRIPTION OF THE PRIOR ART

Figure 1:
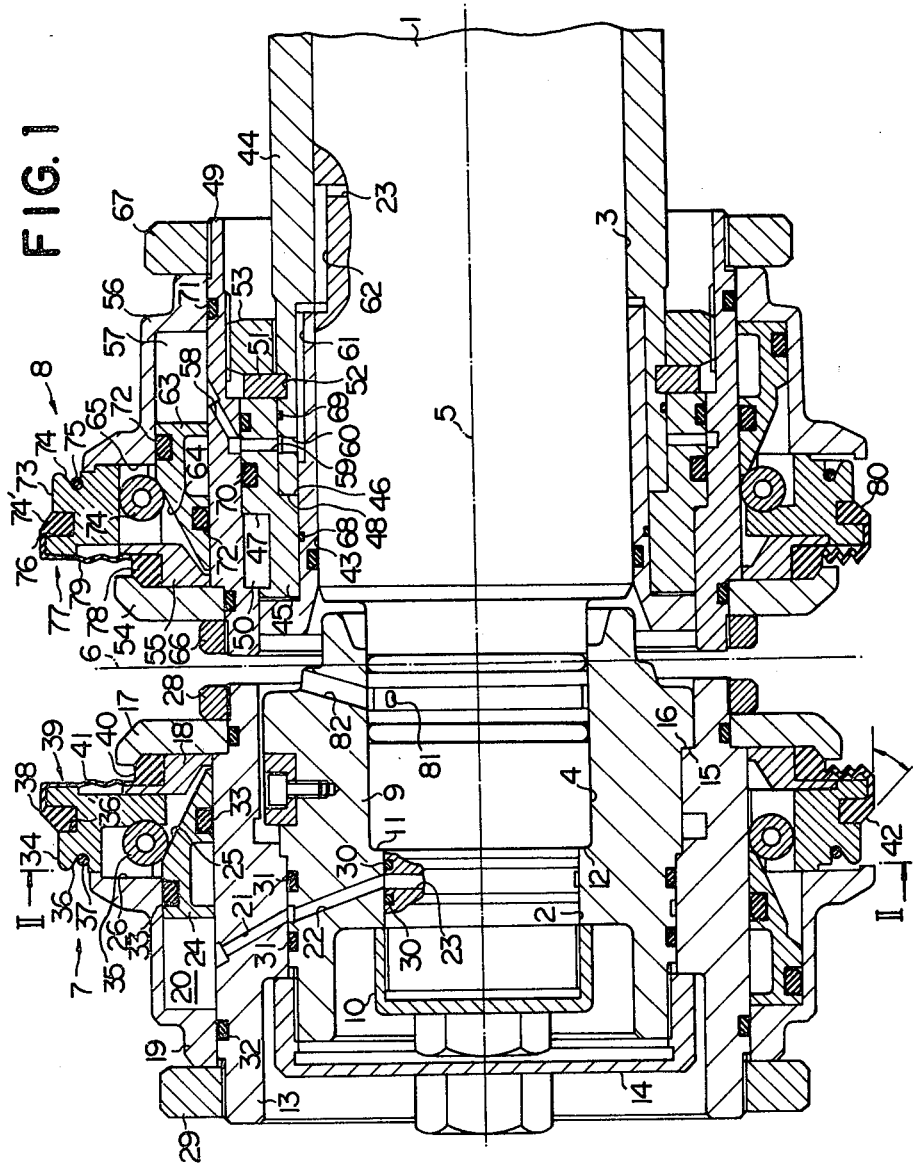
FIG. 1 is a cross sectional view showing overall arrangement and construction of the radial tire building drum according to the present invention.

A prior-art radial tire building drum of this nature to which the present invention appertains is taught in Japanese patent publication No. 45-2469 and Japanese Laying-Open patent publication No. 50-25683. Both the radial tire building drums disclosed therein are radially neither expandable nor contractable. For this reason, the prior-art radial tire building drums have a drawback in that it is difficult to place a radial tire green case on and around the radial tire building drum and withdraw the resultant green case from the radial tire building drum, resulting in a lowering of operational efficiency. In order to resolve this drawback, a prior-art radial tire building drum taught in Japanese Laying-Open patent publication No. 57-22039 has been so far proposed. The radial tire building drum disclosed therein comprises an inner bead assembly and an outer bead assembly carried on an inner drive sleeve and an outer drive sleeve, respectively. The inner bead assembly includes a plurality of arcuate drum segments disposed around the inner drive sleeve through an inner retaining member which is in turn secured to the inner drive sleeve. In a similar manner, the outer bead assembly includes a plurality of arcuate drum segments disposed around the outer drive sleeve through an outer retaining member which is in turn secured to the outer drive sleeve. The inner bead assembly is radially expandable and contractable by moving the inner arcuate drum segments radially outwardly and inwardly, respectively with respect to the inner drive sleeve. In a similar manner, the outer bead assembly is radially expandable and contractable by moving the outer arcuate drum segments radially outwardly and inwardly, respectively with respect to the outer drive sleeve. In the case of radial tire building drum disclosed in the Japanese Laying-Open patent publication No. 57-22039, gaps are formed between the adjacent drum segments when each drum segment is moved radially outwardly. Such drum segments leak air under high pressure introduced in the space defined by a plurality of the drum segments and the green case. Therefore, an annular sealing member is provided to hermetically seal the space defined by a plurality of the drum segments and the green case. The annular sealing member has an upper circumferential end portion tightly received in a plurality of grooves which are circumferentially formed in a plurality of the arcuate drum segments, respectively, a lower circumferential end portion secured to the retaining member and an intermediate portion intervening between the upper and the lower circumferential end portions. Bead portions of the green case placed over the inner and outer bead assemblies are moved axially inwardly on and along the outer circumferential surface of the drum segments and thereafter is held in position at a predetermined position. In order to hold in position the bead portion of the green case at the predetermined position, the upper circumferential end portion of the annular sealing member is axially inwardly reduced in diameter. In the radial tire building drum of the above described type, however, when each of the arcuate drum segments is moved radially outwardly, the annular sealing member is deformed into a plate shape and stretched under the influence of the centripetal force resulting from rotation of the inner and outer drive sleeves. As a consequence, a gap is formed between the arcuate drum segments when the drum segments are expanded. Therefore, such a radial tire building drum still has a drawback in that air under high pressure passes through the gap formed between the arcuate drum segments. Further, another drawback has been encountered in that because the intermediate portions of the annular sealing member is not held in position when the green case is placed on and around a plurality of the arcuate drum segments, there is possibility that the intermediate portion is pushed out over the drum segments by the bead portions of the green case and thus held between the bead portions and the drum segments. In addition, because the intermediate portion of the annular sealing member dangles when the drum segments are contracted and thus is not held in position, there is possibility that the intermediate portion of the annular sealing member is held between the drum segment and members on and along which the drum segments are moved. Further, when the bead portion of the green case is moved on and along the outer surface of the drum segment and thereafter is held in position at the predetermined position, a gap is formed between the bead portion of the green case and the upper circumferential end portion of the annular sealing member by the previously described fact that the upper circumferential end portion is axially inwardly reduced in diameter, In this instance, it is therefore required to move again the drum segments radially outwardly. Furthermore, there have also been problems that a tread center of a tread rubber is shifted when the tread rubber is placed on the green case.

The present invention contemplates elimination of these drawbacks inherent in the conventional radial tire building drums and provision of the improvement of the radial tire building drum.

DESCRIPTION OF THE PREFERRED EMBODIMENT

Referring to FIG. 1, a radial tire building drum embodying the present invention comprises a drive shaft 1 having at its front end portion a small radius portion 2, at its rear end portion a large radius portion 3 and an intermediate radius portion 4 intervening between the small radius portion 2 and the large radius portion 3. The drive shaft 1 is driven to rotate by means of a rotary drive unit not shown and move in the fore-and-aft direction thereof by means of a drive unit not shown. The drive shaft 1 has a center axis 5 of rotation perpendicularly intersecting a mid-circumferential plane 6. The drive shaft 1 has carried at the front side from the mid-circumferential plane 6 a first drum unit 7 which is movable toward and away from the mid-circumferential plane 6 by driving the drive shaft 1 to move in the fore-and-aft direction thereof. The drive shaft 1 further has carried at the rear side from the mid-circumferential plane 6 a second drum unit 8 which is movable toward and away from the mid-circumferential plane 6. The first and second drum units 7 and 8 have has a common center axis which is in axial alignment with the center axis 5 of rotation of the drive shaft 1. Further, the first and second drum units 7 and 8 are synchronizedly movable toward and away from the mid-circumferential plane 6. As a consequence, the first and second drum units 7 and 8 are respectively axially movable equally toward and away from each other.

The first drum unit 7 is constituted by an inner ring member 9 which is tightly received on the the small radius portion 2 and the intermediate radius portion 4 by means of an annular fastening member 10 in such a manner that an inner ledge 11 formed in the inner surface of the inner ring member 9 is fitted to an outer ledge 12 defined by the small radius portion 2 and the intermediate radius portion 4. The inner ring member 9 in turn has tightly received on the outer surface thereof an outer ring member 13 by means of an annular fastening member 14 in such a manner that an outer ledge 15 formed in the outer surface of the inner ring member 9 is fitted to an inner ledge 16 formed in the inner surface of the outer ring member 13. The outer ring member 13 in turn has carried on the outer surface thereof at its inboard end portion an annular retaining member 17 and an inboard cylinder casing 18 which is secured to annular retaining member 17 and at its outboard end portion an outboard cylinder casing 19. The inner surface of the inboard cylinder casing 18, the inner surface of the outboard cylinder casing 19 and the outer surface of the outer ring member 13 as a whole define an axial cylinder chamber 20. The axial cylinder chamber 20 is held in communication with passageways 21, 22 and 23 formed in the outer ring member 13, the inner ring member 9 and the small radius portion 2 of the drive shaft 1, respectively. The passageway 23 formed in the small radius portion 2 of the drive shaft 1 is in turn held in communication with an air compressor not shown. In the axial cylinder chamber 20 is accommodated a piston 24 movable on and along the outer surface of the outer ring member 13 with respect to the outboard cylinder casing 19. The piston 24 has an inclined surface 25 axially inwardly extending from its radially outer end to its radially inner end. A radial chamber 26 is provided above the axial cylinder chamber 20 and defined by the inboard and outboard cylinder casings 18 and 19. One end of the radial chamber 26 is radially inwardly open to the axial cylinder chamber 20 and the other end of the radial chamber 26 is radially outwardly open to the atmosphere. The above noted annular retaining member 17 and outboard cylinder casing 19 are securely retained to the outer surface of the outer ring member 13 by means of an inboard lock nut 28 fitted at inboard end portion of the outer ring member 13 to the externally threaded portion of the outboard ring member 13 and an outboard lock nut 29 fitted at outboard end portion of the outer ring member 13 to the externally threaded portion of the outer ring member 13. Further, the small radius portion 2 of the drive shaft 1, the inner ring member 9, the outer ring member 13 and the piston 24 have seal members 30, 31, 32, and 33, respectively, for hermetically sealing the axial cylinder chamber 20. The above noted inner ring member 9, outer ring member 13, annular retaining member 17, inboard cylinder casing 18, outboard cylinder casing 19 and piston 24 as a whole constitute the first drum unit 7.

In the radial chamber 26 are accommodated a plurality of arcuate drum segments 34 formed of metal and movable radially inwardly and outwardly with respect to the piston 24. Each of the arcuate drum segments 34 has rotatably mounted thereon at its radially inner end a roller 35 which is rollable on and along the inclined surface 25 of the piston 24. Each of the arcuate drum segments 34 further has formed therein at the axially outer end thereof an annular groove 36 and at the radially outer end thereof a generally U-shaped annular groove 36' circumferentially extending therethrough as shown in FIG. 3. In the annular grooves 36 is received a rubber band or resilient band 37 which urges the drum segment 34 against the inclined surface 25 of the piston 24 in the radially inward direction at all times. In the generally U-shaped annular grooves 36' is tightly received a radially outer end portion 38 of an annular rubber sealing member 39 which has a radially inner end portion 40 securely supported by the annular retaining member 17 and the inboard cylinder casing 18. The annular rubber sealing member 39 further has a bellows portion 41 intervening between the radially outer end portion 38 thereof and the radially inner end portion 40 thereof. The radially outer end portion 38 has an inclined surface 42 axially inwardly extending from its radially inner end to its radially outer end as a whole in the shape of frusto-conical.

On the other hand, the above noted second drum unit 8 is constituted by an inner ring member 43 which is slidably received on the large radius portion 3 of the drive shaft 1. The inner ring member 43 has securely mounted at its rear portion on the outer surface thereof a drive sleeve member 44 which is also slidably received on the large radius portion 3 of the drive shaft 1 and which is driven to rotate together with the drive shaft 1 and is driven to move toward and away from the mid-circumferential plane 6 with respect to the drive shaft 1 by means of a drive unit not shown. An intermediate ring member 45 having inner and outer ledges 46 and 47 is securely mounted on the front portion of the inner ring member 43 and the drive sleeve member 44 in such a manner that the inner ledge 46 is fitted to an outer ledge 48 defined by the front portion of the inner ring member 43 and the front portion of the drive sleeve member 44. An outer ring member 49 is securely mounted on the inner ring member 43 and the intermediate ring member 45 through an annular key member 50 which is received in the outer ledge 47 of the intermediate ring member 45. The above noted intermediate ring member 45 and outer ring member 49 are securely retained to the drive sleeve member 44 through a stop ring 51 received in an annular groove 52 which is formed in the drive sleeve member 44 by means of a fastening member 53 fitted to the internally threaded axial portion of the outer ring member 49. The outer ring member 49 in turn has carried on the outer surface thereof at its inboard end portion an annular retaining member 54 and an inboard cylinder casing 55 which is secured to the annular retaining member 54 and at its outboard end portion an outboard cylinder casing 56. The inner surface of the inboard cylinder casing 55, the inner surface of the outboard cylinder casing 56 and the outer surface of the outer ring member 49 as a whole define an axial cylinder chamber 57. The axial cylinder chamber 57 is held in communication with passageways 58, 59, 60, 61 and 62 formed in the outer ring member 49, the intermediate ring member 45, the drive sleeve member 44, the inner ring member 43 and the large radius portion 3 of the drive shaft 1, respectively. The passageway 62 axially formed in the large radius portion 3 of the drive shaft 1 is held in communication with the passageway 23 radially formed in the large radius portion 3 of the drive shaft 1 which is in turn held in communication with the previously noted air compressor not shown. In the axial cylinder chamber 57 is accommodated a piston 63 movable on and along the outer surface of the outer ring member 49 with respect to the outboard cylinder casing 56. The piston 63 has an inclined surface 64 axially inwardly extending from its radially outer end to its radially inner end. A radial chamber 65 is provided above the axial cylinder chamber 57 and defined by the inboard and outboard cylinder casings 55 and 56, respectively. One end of the radial chamber 65 is radially inwardly open to the axial cylinder chamber 57 and the other end of the radial chamber 65 is radially outwardly open to the atmosphere. The above noted annular retaining member 54 and outboard cylinder casing 56 are securely retained to the outer surface of the outer ring member 49 by means of an inboard lock nut 66 fitted at inboard end of the outer ring member 49 to the externally threaded portion of the outer ring member 49 and an outboard lock nut 67 fitted at outboard end of the outer ring member 49 to the externally threaded portion of the outer ring member 49. Further, the inner ring member 43, the drive sleeve member 44, the intermediate ring member 45, the outer ring member 49 and the piston 63 have seal members 68, 69, 70, 71 and 72, respectively, for hermetically sealing the axial cylinder chamber 57. The above noted inner ring member 43, drive sleeve member 44, intermediate ring member 45, outer ring member 49, annular key member 50, fastening member 53, annular retaining member 54, inboard cylinder casing 55, outboard cylinder casing 56 and piston 63 as a whole constitute the second drum unit 8.

In the radial chamber 65 are accommodated a plurality of arcuate drum segments 73 formed of metal and movable radially inwardly and outwardly with respect to the piston 63. Each of the arcuate drum segments 73 has rotatably mounted thereon at its radially inner end a roller 74 which is rollable on and along the inclined surface 64 of the piston 63. Each of the arcuate drum segments 73 further has formed therein at the axially outer end thereof an annular groove 74 and at the radially outer end thereof a generally U-shaped annular groove 74' circumferentially extending therethrough as shown in FIG. 3. In the annular groove 74 is received a rubber band or resilient band 75 which urges the arcuate drum segment 73 against the inclined surface 64 of the piston 63 in the radially inward direction at all times. In the generally U-shaped annular grooves 74' is tightly received a radially outer end portion 76 of an annular rubber sealing member 77 which has a radially inner end portion 78 securely supported by the annular retaining member 54 and the inboard cylinder casing 55. The annular rubber sealing member 77 further has a bellows portion 79 intervening between the radially outer end portion 76 thereof and the radially inner end portion 78 thereof. The radially outer end portion 76 has an inclined surface 80 axially inwardly extending from its radially inner end to its radially outer end as a whole in the shape of frusto-conical. The inclined surface 80 and the previously noted inclined surface 42 are held in slidable engagement with the inner surfaces of the bead portions of the green case when the green case is placed over the first and second drum units 7 and 8. In the intermediate radius portion 4 of the drive shaft 1 is formed a passageway 81 which is used to introduce air under high pressure into the green case enclosed by the first and second drum units 7 and 8. The passageway 81 has its one end communicated with one end of a passageway 82 which has the other end open to the outer surface of the inner ring member 9. The passageway 81 further has its other end communicated with an air compressor not shown.

The intersected angle between the center axis 5 of the drive shaft 1 and the inclined surface 42, 80 ranges from 40 to 60 degrees. The reason is that when the first and second drum units 7 and 8 are moved away from each other with the intersected angle less than 40 degrees, it is required a longer distance as compared with in case of the intersected angle ranging from 40 to 60 degrees to make the inclined surface 42, 80 contact with bead portions of the green case, and this results in a lowering of operational efficiency. In the case of the intersected angle more than 60 degrees, the centripetal force caused by the inclined surface 42, 80 becomes small. For this reason, there is possibility that the center axis 5 of rotation for the drive shaft 1 and a center axis of the green case are shifted to each other.

Description will be now made regarding the operation of the radial tire building drum constructed and arranged as described above in accordance with the present invention Prior to the operation, the drive shaft 1 is withdrawn to its rearmost position and the drive sleeve member 44 is advanced to its foremost position. As a consequence, the first drum unit 7 carried on the drive shaft 1 and the second drum unit 8 carried on the drive sleeve member 44 are positioned most closely with each other as shown in FIG. 1, and the first drum unit 7 and the second drum unit 8 are respectively away from the mid-circumferential plane 6 by equal distances. In this instance, air under pressure is not introduced in the passageway 23 and accordingly the piston 24 of the first drum unit 7 and the piston 63 of the second drum unit 8 are most separated from each other as shown in the lower part in FIG. 1 under restoration forces of rubber bands 37 and 75. Also, the arcuate drum segments 34 of the first drum unit 7 and the arcuate drum segments 73 of the second drum unit 8 are most retracted radially inwardly of the drum segments 34 and 73 under restoration forces of rubber bands 37 and 75, respectively.

Figure 2:
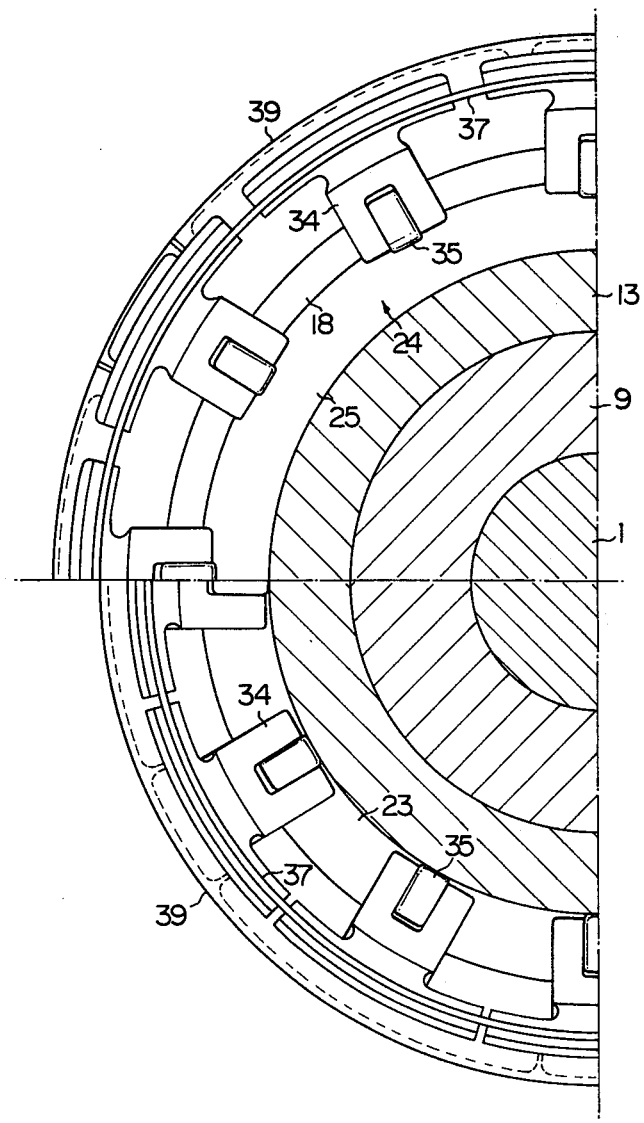
FIG. 2 is a cross sectional view taken on the vertical plane indicated by line II—II in FIG. 1.

In the stage of placing the green case over the first and second drum units 7 and 8, next, the green case is transferred by a transfer unit not shown and placed over the first and the second drum units 7 and 8. The green case is easily placed over the first and second drum units 7 and 8 by the fact that the drum segments 34 and the arcuate drum segments 73 are most retracted radially inwardly of the arcuate drum segments 34 and 73, respectively. In this instance, as the bellows portions 41 and 79 of the annular rubber sealing members 39 and 77, respectively, are contracted, the green case is easily held in position and is not pushed axially outwardly by the bellows portions 41 and 79. Thereafter, air under pressure is introduced in the axial cylinder chambers 20 and 57 by way of the passageway 23, and the pistons 24 and 63 are caused to move axially inwardly toward the mid-circumferential plane 6 upon air under pressure. As the pistons 24 and 63 move axially inwardly, the rollers 35 of the arcuate drum segments 34 and the rollers 74 of the arcuate drum segments 73 are caused to roll on and along the inclined surfaces 25 and 64, respectively. As a consequence, the arcuate drum segments 34 and 73 are expanded radially outwardly thereof against the restoration forces of rubber bands 37 and 75, respectively. Simultaneously, the bellows portions 41 and 79 of the sealing members 39 and 77, respectively, are extended radially outwardly so that the sealing members 39 and 77 follow the arcuate drum segments 34 and 73, respectively. When, thereafter, the arcuate drum segments 34 and 73 are fully expanded, gaps are formed between the adjacent drum segments 34 as shown in the upper part in the FIG. 2. These gaps are hermetically sealed by the bellows portion 41 of the sealing members 39. In a similar manner, gaps formed between the adjacent arcuate drum segments 73 are hermetically sealed by the bellows portion 79 of the sealing members 77.

After the stage of placing the green case over the first and second drum units 7 and 8, the drive shaft 1 is advanced in the fore direction thereof along the center axis 5 and concurrently the drive sleeve 44 is withdrawn in the aft direction thereof along the center axis 5 with the speed equal to that of the drive shaft 1. As a consequence, the first drum unit 7 and the second drum unit 8 are respectively equally moved away from the mid-circumferential plane 6. When, thereafter, the inclined surfaces 42 and 80 are brought into pressure contact with the inner surfaces of the bead portions of the green case by the predetermined pressure, movements of the drive shaft 1 and the drive sleeve member 44 are stopped at the same time. Because of this pressure contact, the inside of the green case is hermetically sealed. It is not required to expand again the arcuate drum segments 34 and 73 at this moment as in the case of the prior-art radial tire building drum by the fact that the inclined surfaces 42 and 80 are brought into pressure contact with the inner surface of the bead portions of the green case by air under the predetermined pressure. Prior to the pressure contact, the bead portions of the green case are moved axially inwardly from the axially outer ends of the arcuate drum segments 34 and 73 to the radially inner ends of the inclined surfaces 42 and 80, respectively. In this instance, friction force between the bead portions of the green case and the arcuate drum segments 34, 73 become small as compared with contact between rubber and rubber by the fact that the bead portions are formed of rubber and the arcuate drum segments 34, 73 are formed of metal. As a consequence, the bead portions of the green case evenly slide on the outer surface of the arcuate drum segments 34 and 73 and for this reason a tread center of a tread rubber is prevented from being shifted when the tread rubber is placed on the green case.

In the stage of forming the green case into a toroidal shape, air under pressure is introduced in the inside of the green case by way of the passageways 81 and 82 and the green case is formed into a toroidal shape. The drive shaft 1 and the drive sleeve 44 are respectively moved equally toward the mid-circumferential plane 6 with the bead portions held in pressure contact with the inclined surfaces 42 and 80. In this instance, gaps between the adjacent drum segments 34 are hermetically sealed by the bellows portion 41 of the sealing member 39. Similarly, gaps between the adjacent arcuate drum segments 73 are hermetically sealed by the bellows portion 79 of the sealing member 77. Further, the air under pressure is prevented from leaking out to the outside of the green case by the reason that the inclined surfaces 42 and 80 hardly change in shape and are held in pressure contact with the bead portions of the green case. Thereafter, the drive shaft 1 and the drive sleeve 44 respectively rotate about the center axis 5 to form the green tire into the toroidal shape, and the tread rubber is placed on the green case in the shape of toroid.

In the stage of withdrawing a resultant product in the shape of toroid, the air compressor ceases introducing air under pressure into the axial cylinder chambers 20 and 57. As a consequence, the arcuate drum segments 34 and 73 are caused to move radially inwardly by the restoration forces of rubber bands 37 and 75, respectively, and the rollers 35 and 74 of the arcuate drum segments 34 and 73, respectively, downwardly roll on the inclined surfaces 25 and 64 of the pistons 24 and 63, respectively, so that the pistons 24 and 63 respectively move axially outwardly. Thereafter, the resultant product is withdrawn by means of the previously noted transfer unit not shown. In this instance, the bellows portions 41 and 79 of the sealing members 39 and 77, respectively, tend to return to the initial positions thereof by the elastic restoration force thereof. For this reason, the bellows portions 41 is prevented from being held between the inboard casing 18 and the arcuate drum segments 34. Similarly, the bellows portions 79 is prevented from being held between the inboard casing 55 and the arcuate drum segments 73.

The stages described above is one cycle for the radial tire building drum in accordance with the present invention. While it has been described that the first and second drum units 7 and 8 are respectively equally movable toward and away from each other, it is not always necessary both are movable. In this instance, the first and second drum units are axially movable toward and away from each other by driving at least one of the first and second drum units to move along the common center axis of rotation.

What is claimed is:

1. A radial tire building drum for forming a radial tire green case having bead portions into a toroidal shape, comprising:
    a drive shaft rotatable about a center axis of rotation and movable in a fore-and-aft direction thereof;
    a pair of drum units carried on said drive shaft and having a common center axis of rotation which is in axially alignment with said center axis of said drive shaft, the drum units being axially movable toward and away from each other along said center axis of said drive shaft by driving at least one of said drum units to move along said common center axis of rotation;
    a plurality of arcuate drum segments each retained to said pair of drum units and formed with an annular groove circumferentially extending therethrough, each of the arcuate drum segments being radially movable toward and away from said common center axis; and
    a pair of annular rubber sealing members for hermetically sealing space defined by said green case and said pair of drum units and each having a radially inner end portion, a radially outer end portion and a bellows portion intervening between the radially outer end portion and the radially inner end portion, the radially inner end portions being supported by said drum units, the radially outer end portions being tightly received in said annular grooves formed in said arcuate drum segments.

2. A radial tire building drum as set forth in claim 1, in which said radially outer end portion of said annular rubber sealing member has an inclined surface axially inwardly extending from its radially inner end to its radially outer end as a whole in the shape of frusto-conical, the intersected angle between said center axis of the drive shaft and said inclined surface ranging from 40 to 60 degrees.

3. A radial tire building drum as set forth in claim 1, in which said arcuate drum segments are formed of metal so that said bead portions of said green case evenly slide on the outer surface of said arcuate drum segments.

4. A radial tire building drum as set forth in claim 1, in which said pair of drum units comprises first and second drum units, the first drum unit being constituted by a first inner ring member having an outer ledge and tightly received on said drive shaft, a first outer ring member having an inner ledge and tightly received on said first inner ring member in such a manner that said outer ledge of said first inner ring member is fitted to said inner ledge of said first outer ring member, an annular retaining member carried on said first outer ring member, a first inboard cylinder casing secured to said annular retaining member, a first outboard cylinder casing carried on said first outer ring member and a first piston movable along said first outer ring member with respect to said first outboard cylinder casing, the second drum unit being constituted by a second inner ring member slidably received on said drive shaft, a drive sleeve member having securely mounted thereon said inner ring member and slidably received on said drive shaft and rotatable together with said drive shaft and movable in the fore-and-aft direction of said drive shaft with respect to said drive shaft, an intermediate ring member having inner and outer ledges and securely mounted on said inner ring member and said drive sleeve member in such a manner that said inner ledge of said intermediate ring member is fitted to an outer ledge defined by said inner ring member and said drive sleeve member, a second outer ring member having an internally threaded portion and securely mounted on said second inner ring member and said intermediate ring member, an annular key member received in said outer ledge of said intermediate ring member, a fastening member fitted to said internally threaded portion of said second outer ring member, an annular retaining member carried on said second outer ring member, a second inboard cylinder casing secured to the annular retaining member, a second outboard cylinder casing carried on said second outer ring member and a second piston movable along said second outer ring member with respect to said second outboard cylinder casing.

* * * * *